(12) United States Patent
Moheghi et al.

(10) Patent No.: US 12,429,400 B1
(45) Date of Patent: Sep. 30, 2025

(54) OPTICAL TRANSMISSION TESTER

(71) Applicant: Meta Platforms Technologies, LLC, Menlo Park, CA (US)

(72) Inventors: Alireza Moheghi, Bothell, WA (US); Kang Wei, Redmond, WA (US); William Duncan, Kenmore, WA (US); Peter Jasinski, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 142 days.

(21) Appl. No.: 17/709,429

(22) Filed: Mar. 31, 2022

Related U.S. Application Data

(60) Provisional application No. 63/292,598, filed on Dec. 22, 2021.

(51) Int. Cl.
*G01M 11/02* (2006.01)
*G01M 11/04* (2006.01)

(52) U.S. Cl.
CPC ........ *G01M 11/0207* (2013.01); *G01M 11/04* (2013.01)

(58) Field of Classification Search
CPC ...... H04N 17/002; H04N 23/52; H04N 23/56; H04N 23/74; H04N 23/695; F25B 21/02; G01M 11/00; G01M 11/081; G01M 11/0207; G01M 11/02; G01M 11/04; G01M 99/002; G06F 3/013; G02B 27/0093; G02B 7/008; G02B 7/1815; G01N 21/88; G01N 2021/157
See application file for complete search history.

(56) References Cited

U.S. PATENT DOCUMENTS

| | | | |
|---|---|---|---|
| 5,515,682 A | 5/1996 | Nagakubo et al. |
| 6,215,323 B1 | 4/2001 | Rennies et al. |
| 6,753,828 B2 | 6/2004 | Tuceryan et al. |
| 10,684,494 B2 | 6/2020 | Blum et al. |
| 10,704,984 B2 | 7/2020 | Kang et al. |
| 11,085,879 B1 | 8/2021 | Ziegler et al. |

(Continued)

FOREIGN PATENT DOCUMENTS

FR          2974904 A1 * 11/2012 ............ G01M 11/02

OTHER PUBLICATIONS

Margaret Z. Dominguez, Lirong Wang, Peng Su, Robert E. Parks, James H. Burge, "Software configurable optical test system for refractive optics," Proc. SPIE 8011, 22nd Congress of the International Commission for Optics: Light for the Development of the World, 80116Q (Nov. 2, 2011) (Year: 2011).*

(Continued)

*Primary Examiner* — Dominic J Bologna
*Assistant Examiner* — Adrian Ignacio Silva
(74) *Attorney, Agent, or Firm* — McDermott will & Emery LLP

(57) ABSTRACT

An apparatus, system, and method for a see-through optical verification tester are described herein. In some aspects, a heating element such as a Peltier or Thermoelectric Cooler "TEC" may be used to control a temperature of an optical element. In examples, the see-through optical transmission tester includes a see-through void and may control temperature, humidity, and pressure of an environmental enclosure to facilitate optical see-through and reflective tests.

19 Claims, 5 Drawing Sheets

(56) References Cited

U.S. PATENT DOCUMENTS

| | | | |
|---|---|---|---|
| 2007/0188407 A1* | 8/2007 | Nishi | G02B 25/001 |
| | | | 348/E5.145 |
| 2011/0116170 A1* | 5/2011 | Smith | G02B 3/0087 |
| | | | 359/652 |
| 2017/0177085 A1 | 6/2017 | Sun et al. | |
| 2019/0163267 A1 | 5/2019 | Hainzl et al. | |
| 2019/0302443 A1* | 10/2019 | Garrison | G03B 17/566 |
| 2020/0093361 A1 | 3/2020 | Jackson et al. | |
| 2020/0239823 A1* | 7/2020 | Tanabe | C12M 33/14 |
| 2021/0063685 A1 | 3/2021 | Ahmadi et al. | |
| 2021/0266474 A1 | 8/2021 | Sharma et al. | |
| 2022/0171332 A1* | 6/2022 | Cuche | G03H 1/0005 |
| 2023/0199167 A1 | 6/2023 | Moheghi et al. | |
| 2024/0069453 A1* | 2/2024 | Beder | G03F 7/70891 |

OTHER PUBLICATIONS

Margaret Z. Dominguez, Lirong Wang, Peng Su, Robert E. Parks, James H. Burge, "Software configurable optical test system for refractive optics," Proc. SPIE 8011, 22nd Congress of the International Commission for Optics: Light for the Development of the World, 80116Q https://doi.org/10.1117/12.900879 (Year: 2011).*

"The misting characteristics of spectacle lenses" Margrain, Tom H. ; Owen, Chris Ophthalmic & physiological optics, Mar. 1996, vol. 16 (2), p. 108-114, Article 108 (Year: 1996).*

Notice of Allowance mailed Jun. 4, 2024 for U.S. Appl. No. 17/709,423, filed Mar. 31, 2022, 13 pages.

English Translation of Berger et al., FR2974904A1, 2012, 9 pages.

Non-Final Office Action mailed Feb. 14, 2024 for U.S. Appl. No. 17/709,423, filed Mar. 31, 2022, 33 pages.

\* cited by examiner

OPTICAL TRANSMISSION TESTER

CROSS-REFERENCE TO RELATED APPLICATION

The present Application claims the benefit of U.S. Provisional Application No. 63/292,598, entitled "In situ See-Through Eye-Tracking Optical Verification Tester" filed Dec. 22, 2021. U.S. Provisional Application No. 63/292,598 is expressly incorporated herein by reference in its entirety.

FIELD OF DISCLOSURE

Aspects of the present disclosure relate generally to the testing of optical elements, and in particular, but not exclusively to the testing of optical elements under various environmental conditions.

BACKGROUND

A thermoelectric cooler (TEC), e.g., a Peltier cooler, operates according to the Peltier effect. The Peltier effect occurs when current is passed through a junction between two materials made of dissimilar conductors, creating a temperature differential. Arrangements of semiconductors may form a Peltier device which serve as a solid-state heat pump for heating, cooling, or control of temperature.

BRIEF DESCRIPTION OF THE DRAWINGS

Non-limiting and non-exhaustive aspects of the present disclosure are described with reference to the following figures, wherein like reference numerals refer to like parts throughout the various views unless otherwise specified.

DETAILED DESCRIPTION

Figure 1:
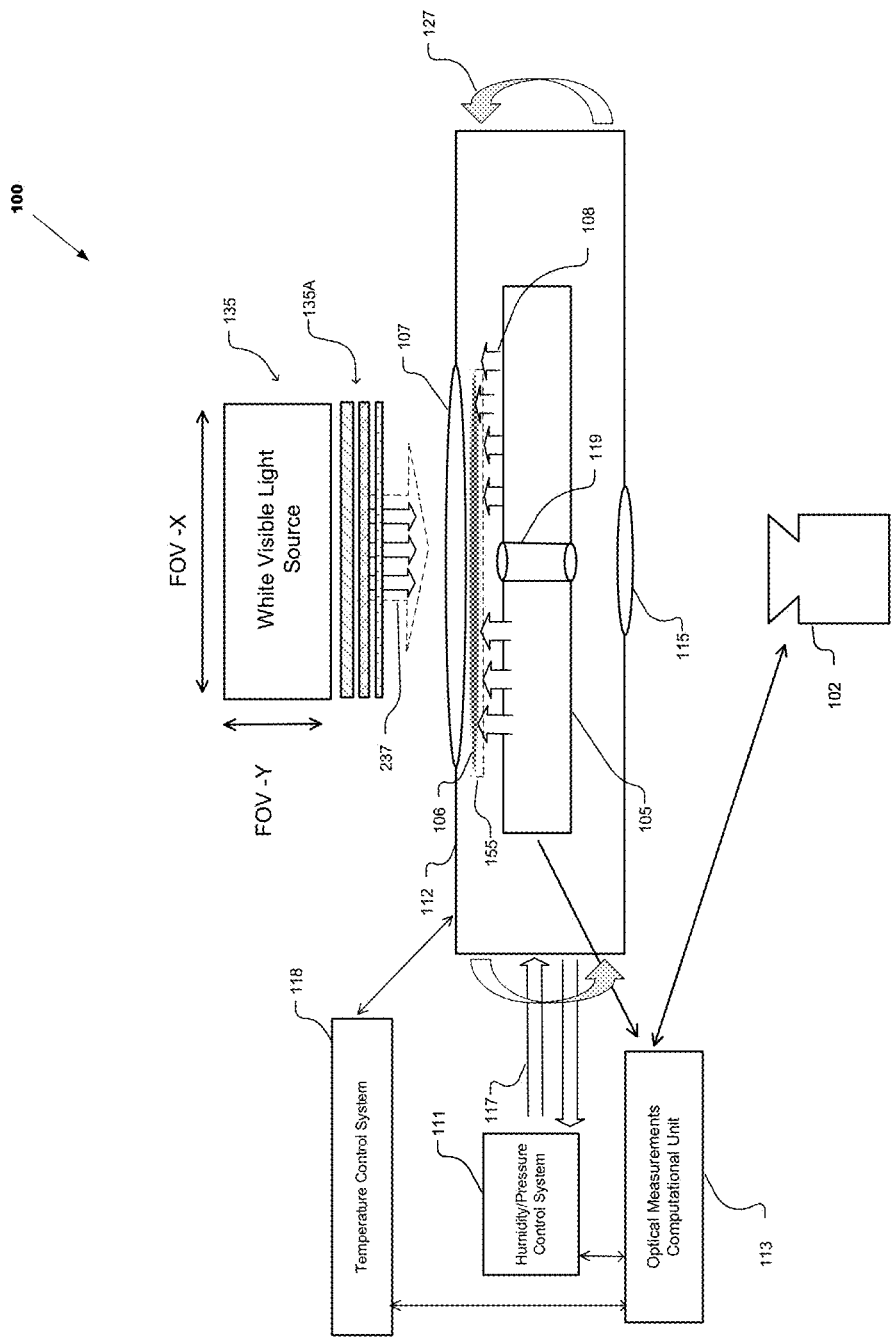
FIG. 1 illustrates a see-through optical transmission tester, in accordance with aspects of the present disclosure.

Embodiments of a see-through optical verification tester for an optical element are described herein. In some aspects, a heating element such as a Peltier or Thermoelectric Cooler "TEC" may be used to control a temperature of the optical element. In examples, the see-through optical transmission tester includes a see-through void and may control temperature, humidity, and pressure of an environmental enclosure to facilitate optical see-through and reflective tests.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 µm.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, the term "transparent" may be defined as having greater than 90% transmission of light. In some aspects, the term "transparent" may be defined as a material having greater than 90% transmission of visible light.

Optical components or elements may be implemented in products that are exposed to a wide variety of environments, from indoor conditions to extreme outdoor conditions. The functionality of the optical elements may vary when subject to different temperature, pressure, and humidity conditions. As one example, the quality of an image presented to a user may be affected by the changing optical transmissibility of optical elements. Accordingly, testing of optical elements under various conditions is desired. Due to environmental chamber sizes and other limitations, however, adequate testing can be a challenge. Current testing solutions may not exist or are not suitable for testing optical components, in particular, see-through optical elements.

Accordingly, in implementations of the disclosure, a see-through optical transmission tester offers compact gas-tight and/or vacuum-tight capability for optical see-through and reflective tests of optical elements. In aspects, a heating element such as a Peltier or Thermoelectric Cooler "TEC" may control a temperature of an optical element and includes a see-through hole or void. An environmental enclosure including the heating element and the optical element may provide controlled humidity and atmospheric pressure outside of and/or independent of a light sensor or camera. In some examples, optical elements for head mounted devices such as, augmented reality (AR) head mounted displays, may be tested using the system.

Referring now to FIG. 1, which illustrates a see-through optical transmission tester 100, according to aspects of the disclosure. As shown, in FIG. 1, see-through optical transmission tester ("testing system 100") includes a light source 135, an environmental enclosure 112, and a light sensor 102. In the example, light source 135 is a white visible light source that may transmit light through removable RGB filters 135A. In some aspects, removable RGB filters 135A have a similar or same sensitivity of a Display Projector Assembly DPA laser source wavelength. In various embodiments, light source 135 is controllable to provide illumination light in different colors and from different angles in substantially all active areas of a field-of-view (FOV), e.g., of a potential user. In aspects, light source 135 may illuminate light from different angles, e.g., such as but not limited to, an approximately 0.1 degree resolution.

Note that in other examples, light source 135 may include displays or arrays such as, e.g., a liquid crystal display (LCD) or an organic light emitting diode (OLED) pixel array. In other examples, light source 135 includes e.g., an integrating sphere RGB illumination light source, such as described in connection with FIG. 2.

Figure 3:
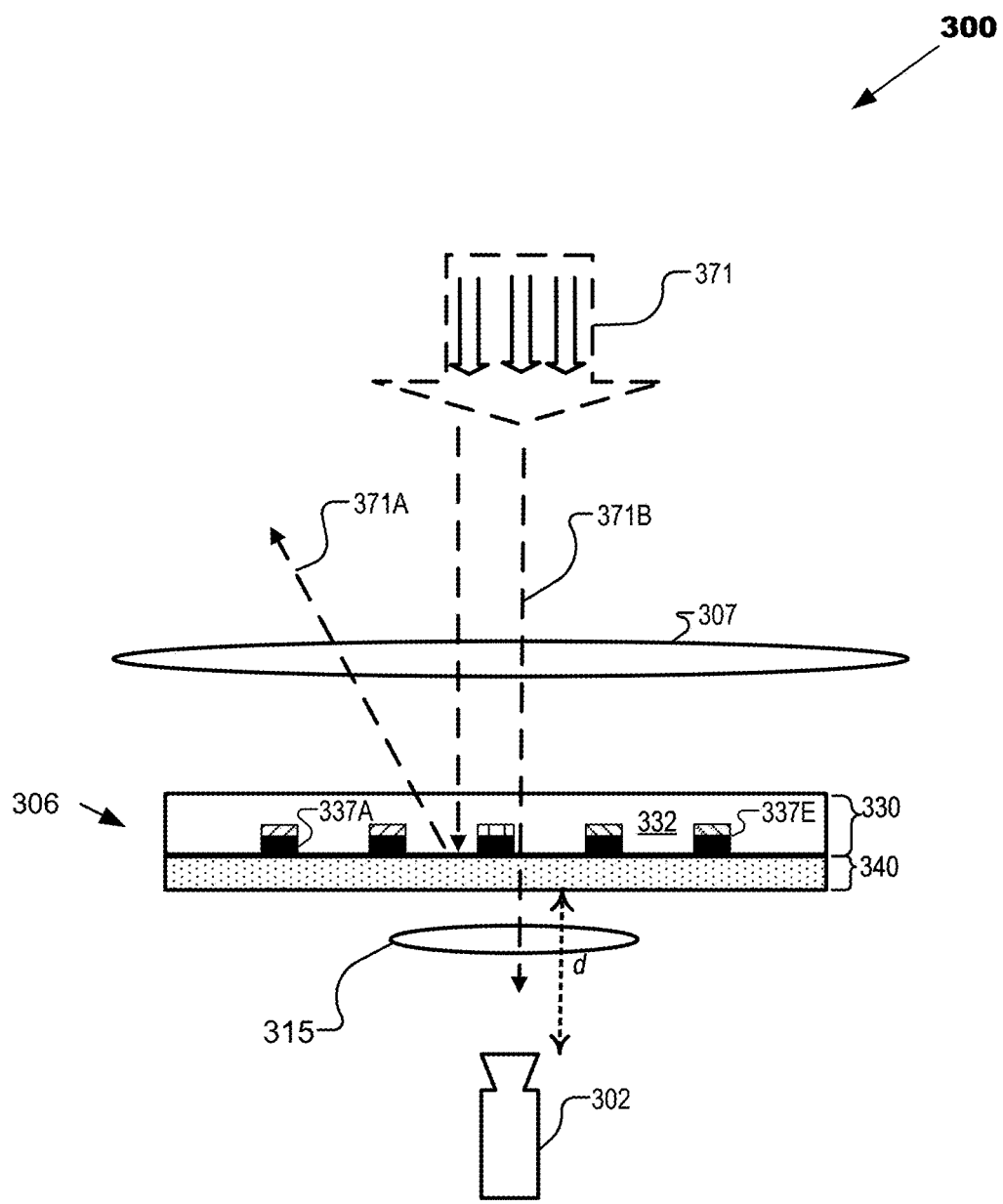
FIG. 3 illustrates an example eye-tracking optical element, in accordance with aspects of the present disclosure.

In FIG. 1, an optical element 106 is proximally located to a heating element 105 in environmental enclosure 112. In some examples, optical element 106 is an optical element through which light may propagate through or partially through. Accordingly, see-through optical transmission tester 100 may test a level of optical transmission and/or reflectivity or other aspect of optical element 106 under varying environmental conditions. In some aspects, the optical element 106 is or includes an optical element such as, e.g., an eye-tracking element (e.g., as shown in the example of FIG. 3), waveguide element, or lens module. In some examples, a mechanical stage (represented by dotted lines 155) may move optical element 106 laterally (or in other directions or dimensions) in order to verify functionality of optical element 106 at different locations relative to incoming illumination light 237.

In aspects, a temperature control system 118, humidity/pressure control system 111, and optical measurements computational unit 113 are coupled to environmental enclosure 112. Humidity/pressure control system 111 is coupled to environmental enclosure 112 via gas exchange tubes 117. In aspects, heating element 105 is a Peltier which varies temperature on a surface of optical element 106. In embodiments, optical element 106 may be in contact with or in close proximity to heating element 105 such that optical element 106 accepts heat (e.g., indicated by arrows 108) generated by heating element 105. Temperature control system 118 may adjust an electrical current driven through the Peltier or heating element 105 to adjust its temperature.

In embodiments, heating element 105 has a see-through void (e.g., reference 119 in FIG. 1). Environmental enclosure 112 includes an entrance path window 107 and a detection window 115 disposed on opposite sides of environmental enclosure 112. Accordingly, illumination light propagates through entrance path window 107, the see-through void 119 and the detection window 115, in that order, prior to becoming incident on light sensor 102.

Note that see-through void 119 may have a dimension (e.g., a diameter) of approximately 1 cm, in some implementations. In other implementations, the dimensions may vary according to various factors, e.g., size of the optical component being tested.

Figure 2:
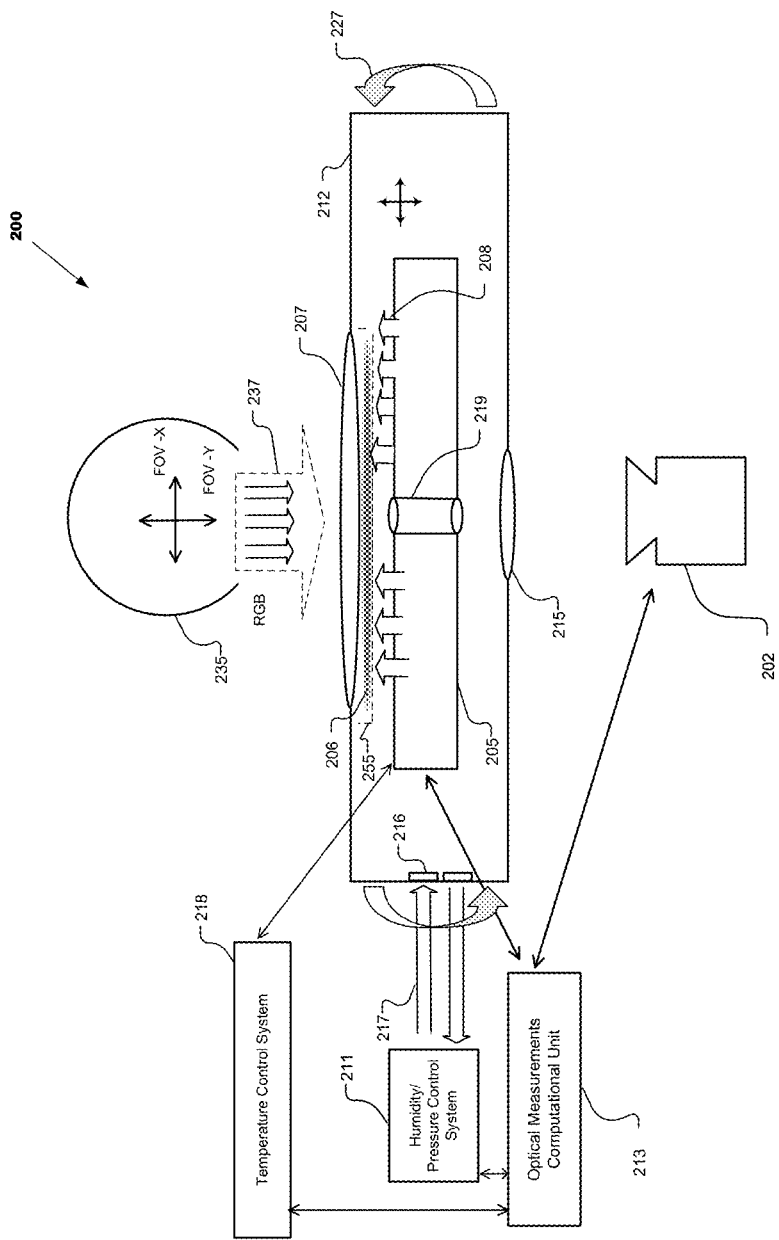
FIG. 2 illustrates another see-through optical transmission tester, in accordance with aspects of the present disclosure.

FIG. 2 illustrates an embodiment of a see-through optical transmission tester 200, according to aspects of the disclosure. As shown in FIG. 2, see-through optical transmission tester 200 ("testing system 200") includes a light source 235, an environmental enclosure 212, and a light sensor 202 or camera. In the illustrated example, light source 235 is an RGB integrating sphere. For example, light source 235 may include RGB light emitting diodes (LEDs) that can be tuned to generate different colors/wavelengths of light.

Note that see-through optical transmission tester 200 may include similar elements to see-through optical transmission tester 100 of FIG. 1. In FIG. 2, an optical element 206 to be tested is located proximally to a heating element 205 inside environmental enclosure 212. In some examples, a mechanical stage (represented by dotted lines 255) that holds or is coupled to optical element 206 may move optical element 206 into different lateral positions or along an XY (or Z plane in some embodiments) to allow for testing of the optical element according to/from different angles relative to illumination light 237. Arrows 227 indicate an optomechanical part that may assist optical element 206 with motorized movements.

In aspects, heating element 205 may be a Peltier which can vary temperature on a surface of optical element 206. In embodiments, optical element 206 may be in contact with or positioned in close proximity to heating element 205 such that optical element 206 accepts heat (e.g., 208) generated by heating element 205. In aspects, a temperature control system 218, humidity/pressure control system 211, and optical measurements computational unit 213 are coupled to environmental enclosure 212. Temperature control system 218 may adjust an electrical current driven through the Peltier or heating element 205 to adjust its temperature. Environmental enclosure 112 may be configured to receive humidity or pressure inputs from a humidity/pressure input port, e.g., 216, for changing humidity or atmospheric pressure within environmental enclosure 112.

Similar to heating element 105 of FIG. 1, heating element 205 has a see-through void (e.g., reference 219 in FIG. 2). Environmental enclosure 212 includes an entrance path window 207 and a detection window 215 disposed on opposite sides of environmental enclosure 212. Accordingly, illumination light propagates through entrance path window 207, the see-through void 219 and the detection window 215, in that order, prior to becoming incident on light sensor 202.

Note that similar to the see-through void 119 of FIG. 1, see-through void 219 may have a dimension (e.g., a diameter) of approximately 1 cm, in some implementations. In other implementations, the dimensions may vary according to various factors, e.g., size of the optical component or element being tested.

As shown, in FIGS. 1 and 2, in aspects, the optical measurement computational unit (e.g., 113, 213) may be coupled via, e.g., electrical wiring or wireless signal, to send and receive signals from the humidity/pressure control system (e.g., 111, 211), light sensor (e.g., 102, 202), temperature control system (118, 218) and illumination source (e.g., 125, 235). The temperature control system (118, 218) and humidity/pressure control system may be configured to adjust temperature and humidity or pressure in the environmental enclosures (e.g., 112, 212) to simulate an environmental condition. In embodiments, the environmental enclosures are configured to receive humidity and atmospheric pressure inputs from the humidity/pressure control systems via gas exchange tubes (e.g., 117, 217). In examples, the environmental enclosure is vacuumed-sealed. Note that the light sensor (e.g., 102, 202) may be external and independent of the environmental enclosure allowing for a compact configuration as well as undistorted data collection.

In aspects, conditions in the environmental enclosure may be controlled between −10° C. to 40° C. In various examples, humidity may be controlled between 0% to 70% and various atmospheric pressures may be controlled so that the optical element is tested under a variety of environmental contexts or conditions. The optical tests of the optical element may include for example, transmission, haze, signal to noise ratio (SNR), contrast to noise ratio (CNR), and/or modulation transfer function (MTF) optical tests.

FIG. 3 illustrates an example of an optical element 306 including an illumination layer 330 and an optical combiner layer 340. In some aspects, optical element 306 may be similar or the same as optical element 106 or 206 of FIGS. 1 and 2. In the example of FIG. 3, optical element 306 is an optical eye-tracking element and during operation may transmit at least a portion of illumination light 371 to a light sensor 302. In aspects, illumination light 371 originates from an illumination source and may propagate through an entrance path window 307, optical element 306, a see-through void (e.g., 119 and 219 of respective FIG. 1 and FIG. 2) of a heating element (e.g., 105 and 205 of respective FIG. 1 and FIG. 2), and a detection window 315 prior to becoming incident on light sensor 302. In examples, the see-through optical transmission tester (e.g., 212) assists in checking see-through parameters for optical element 306 in different environments provided by environmental enclosure 212.

Note that in other embodiments, the optical element may be a waveguide, e.g., one configured to present display light including a virtual image to an eyebox region of, e.g., a head mounted display (HMD) device. Note that in some embodiments, light sensor 302 is spaced from placement of optical element 306 by an eye-relief distance, d. In various examples, the eye-relief distance is between 8 millimeters (mm) and 50 mm.

In the embodiment of FIG. 3, illumination layer 330 includes illuminators 337A-337E, which may be, e.g., infrared light emitting diodes (LEDs) or vertical cavity surface emitting lasers (VCSELs). In embodiments, illumination layer 330 may include a transparent encapsulant 332. In an example, illumination light 371 may simulate light that becomes incident on an optical combiner layer 340 during eye-tracking operations and is reflected (e.g., 371A). Other light rays of illumination light (e.g., 371B) may propagate through optical element 306 to become incident on light sensor 302.

In various examples, optical combiner layer 340 may include a volume hologram or other diffractive structure. Note that although FIG. 3 only illustrates one illuminator, a plurality of illuminators 337 (e.g., a 5×5 two-dimensional array) may also be included.

In aspects, see-through void 119 allows for optical measurements of illumination light 371 from an illumination source. Consequently, an optical test algorithm covering variation of temperature, humidity and pressure can be used to verify optical performance.

Figure 4:
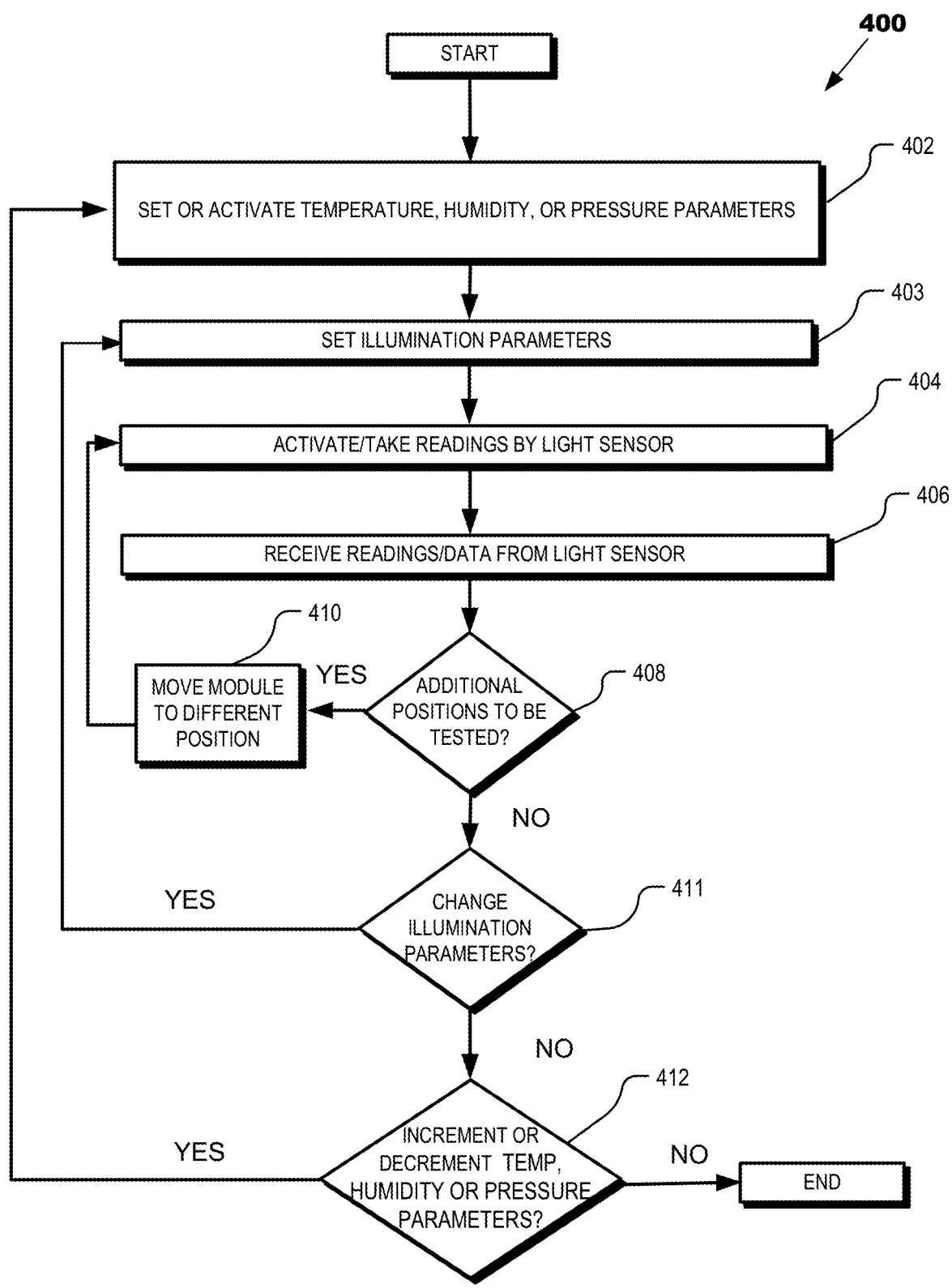
FIG. 4 is a flow chart that illustrates an example process for the see-through optical transmission testers of FIGS. 1 and 2, in accordance with aspects of the present disclosure.

FIG. 4 is a flow chart that illustrates an example process 400 for the see-through optical transmission tester of FIGS. 1 and 2, in accordance with aspects of the present disclosure. Process 400 is one example process performed by an optical measurement processing logic or optical measurements computational unit 113 or 213 of respective FIG. 1 and FIG. 2, which may be included in computing device 502 of FIG. 5. Process 400 may be described with additional reference to elements of FIGS. 1 and 2.

In embodiments, after the start block, at process block 402, computing device 502 sets and/or initiates temperature, humidity, and/or pressure parameters for environmental enclosure 112. For example, computing device 502 sends temperature commands to a temperature control system 118 and/or humidity/pressure control system 111. In the example, temperature control system 118 is configured to adjust the heating element 105 in response to receiving the temperature commands. The humidity/pressure control system 111 is configured to adjust the humidity or pressure of environmental enclosure 112 in response to receiving humidity or pressure commands.

In aspects, at a next process block 403, computing device 502 sets (and activates) illumination parameters for an illumination source, such as, e.g., an intensity or color for a light source (e.g., 135 or 235). In next process block 404, computing device 502 may activate or initiate readings from light sensor 102.

After light sensor 102 has taken readings or optical measurements, the computing device 502 may receive the readings or optical measurements from light sensor 102 at a process block 406. In aspects, at a next process block 408, computing device 502 determines whether testing is to be conducted at an additional position of the optical element 106 (or "module"). If YES, flow moves to block 410 where computing device 502 may drive a mechanical stage to position the module in a different lateral (or other) position with respect to see-through void 119.

Thus, flow then returns to block 404 where process 400 or computing device 502 begins again to activate/initiate readings from light sensor 102 as optical element 106 arrives at a different lateral position. In aspects, process 404 may loop through process blocks 404-408 until there are no additional positions to be tested at the current temperature, humidity, and/or pressure parameters. At that point, the answer at decision block 408 is NO, and flow moves to decision block 411 where it is determined whether illumination parameters should be changed. If the answer is YES, then process 400 returns to process block 403 where illumination parameters are set or changed. For example, optical measurement processing logic is configured to drive a light source (e.g., 135 or 235) to change a color of illumination light emitted by the light source. In some examples, a removable RGB filter is changed (e.g., 135A).

In aspects, process 400 may loop through process blocks 403-411 until there are no additional positions to be tested at the current illumination parameters where the answer at process block 411 is NO. At a next process block 412, it is determined whether the temperature, humidity, or pressure parameters or should be incremented or decremented. If the answer is YES, then flow returns to process block 402 where the parameters are changed. In aspects, the flow then loops through process blocks 402 through 412 until the answer is NO at block 412. The process 400 may then end.

It is understood that process 400 is merely a simplified example of utilization of the see-through optical transmission tester of FIGS. 1 and 2. Note that additional (or fewer) process blocks may be included in process 400. Furthermore, the order in which some or all of the process blocks appear in process 400 should not be deemed limiting. Rather, one of ordinary skill in the art having the benefit of the present disclosure will understand that some of the process blocks may be executed simultaneously or in a variety of orders not illustrated.

Figure 5:
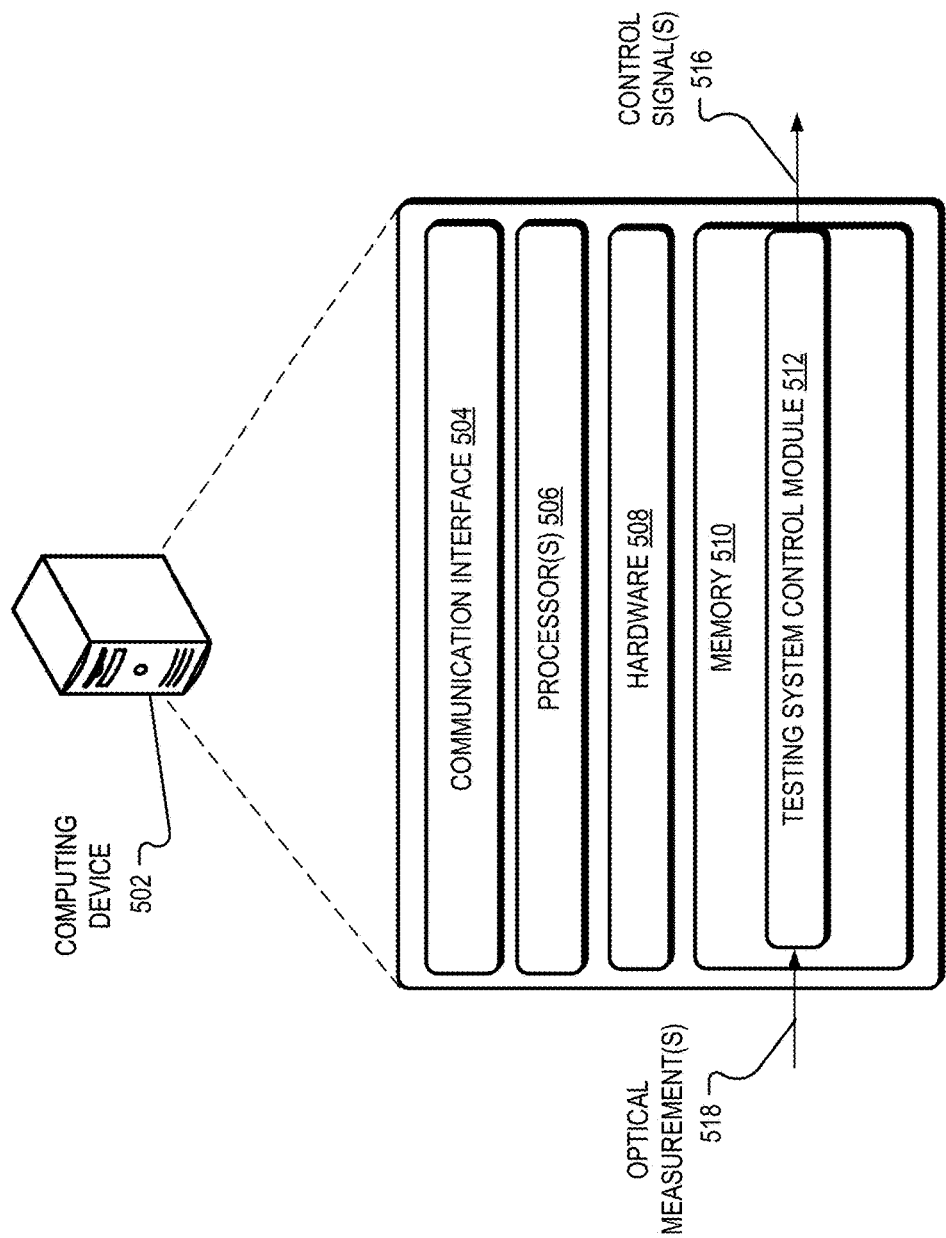
FIG. 5 illustrates an example computing device associated with the see-through optical verification tester, in accordance with aspects of the present disclosure.

FIG. 5 illustrates an example computing device 502 for the see-through optical transmission verification tester or testing system 100 of FIGS. 1 and 2, in accordance with aspects of the present disclosure. As noted above, computing device 502 is one possible implementation of the optical measurements computational unit 113. The illustrated example of computing device 502 is shown as including a communication interface 504, one or more processors 506, hardware 508, and a memory 510.

The communication interface 504 may include wireless and/or wired communication components that enable the computing device 502 to transmit data to and receive data from other networked devices including, e.g., humidity/ pressure control system 111, eye-tracking camera 102, and temperature control system 118 of FIG. 1. The hardware 508 may include additional hardware interface, data communication, or data storage hardware. For example, the hardware interfaces may include a data output device (e.g., electronic display, audio speakers), and one or more data input devices.

The memory 510 may be implemented using non-transitory computer-readable media, such as computer storage media. In some aspects, computer-readable media may include volatile and/or non-volatile, removable and/or non-removable media implemented in any method or technology for storage of information such as computer-readable instructions, data structures, program modules, or other data. Computer-readable media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

The processors 506 and the memory 510 of the computing device 502 may implement testing system control module 512, e.g., optical measurements computational unit 113. The testing system control module 512 may include routines, program instructions, objects, and/or data structures that perform particular tasks or implement particular abstract data types. The memory 510 may also include a data store (not shown) that is used by the testing system control module 512.

The testing system control module 512 may be configured to receive light sensor or optical measurements 518 (e.g., from light sensor 102) and may generate one or more control signals 516 to perform one or more of the processes described in connection with flow chart 400 of FIG. 4. The processors 506 and the memory 510 of the computing device 502 may implement additional modules that are not explicitly illustrated in FIG. 5.

Embodiments of the invention may be utilized for testing for an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system, comprising:
a light source to emit illumination light;
a light sensor; and
an environmental enclosure disposed between the light source and the light sensor and configured to control humidity and atmospheric pressure to simulate an environmental condition within the environmental enclosure, wherein the environmental enclosure includes a heating element located entirely inside the environmental enclosure, the heating element to pass a portion of the illumination light to the light sensor and to provide heat to an optical element to assist in testing an optical transmission or reflectivity of the optical element under the environmental condition, wherein the illumination light propagates from the light source through the heating element via a see-through void in the heating element, prior to becoming incident on the light sensor.

2. The system of claim 1, wherein an entrance path window and a detection window are disposed on opposite sides of the environmental enclosure.

3. The system of claim 1, wherein the heating element includes a Peltier to control a temperature of the optical element.

4. The system of claim 1, wherein the light sensor is spaced from the optical element by an eye-relief distance that is between 8 millimeters (mm) and 50 mm.

5. The system of claim 1, wherein the optical element is a near-eye optical element.

6. The system of claim 5, wherein the near-eye optical element includes a waveguide configured to present display light including a virtual image to an eyebox region.

7. The system of claim 1, wherein the light source includes at least one of an integrating sphere, a liquid crystal display (LCD) pixel array, or an organic light emitting diode (OLED) pixel array.

8. The system of claim 1, wherein the light sensor includes a camera.

9. The system of claim 1, further comprising:
optical measurement processing logic; and
a mechanical stage configured to hold the optical element and configured to move the optical element with respect to the see-through void in the heating element, wherein the optical measurement processing logic is configured to:
drive the mechanical stage to position the optical element in different lateral positions with respect to the heating element along an X-Y plane relative to the see-through void; and
initiate an optical measurement with the light sensor as the optical element stops at the different lateral positions.

10. The system of claim 9, further comprising:
a temperature control system configured to receive temperature commands from the optical measurement processing logic, wherein the temperature control system is configured to adjust the heating element in response to receiving the temperature commands from the optical measurement processing logic.

11. The system of claim 9, further comprising:
a humidity/pressure control system configured to receive humidity commands and pressure commands from the optical measurement processing logic, wherein the humidity/pressure control system is configured to adjust the humidity or pressure of the environmental enclosure in response to receiving the humidity commands or pressure commands, respectively.

12. The system of claim 11, further comprising:
gas exchange tubes coupled between the humidity/pressure control system and the environmental enclosure, wherein the environmental enclosure is configured to receive humidity and atmospheric pressure inputs from the humidity/pressure control system via the gas exchange tubes.

13. The system of claim 9, wherein the optical measurement processing logic is configured to drive the light source to change a color of the illumination light emitted by the light source.

14. The system of claim 1, wherein the environmental enclosure is vacuum sealed.

15. An environmental enclosure comprising:
a humidity/pressure input port, wherein the environmental enclosure is configured to receive humidity or pressure inputs from the humidity/pressure input port for changing humidity or atmospheric pressure within the environmental enclosure;
a heating element including a see-through void that runs through the heating element;
a mechanical stage configured to hold an optical element to receive heat from the heating element and configured to move the optical element with respect to the see-through void of the heating element;
an entrance path window; and
a detection window disposed on an opposite side of the environmental enclosure from the entrance path window, wherein the entrance path window, the detection window, and the see-through void are aligned to pass illumination light from a light source, through the entrance path window, the see-through void, and the detection window to a light sensor, in that order.

16. The environmental enclosure of claim 15, wherein the illumination light is provided by a light source that includes at least one of an integrating sphere, a liquid crystal display (LCD) pixel array, or an organic light emitting diode (OLED) pixel array.

17. The environmental enclosure of claim 15, wherein the heating element includes a Peltier.

18. The environmental enclosure of claim 17, wherein the light sensor is external to the environmental enclosure.

19. The environmental enclosure of claim 15, wherein the mechanical stage is configured to move the optical element along an X-Y plane relative to the see-through void.

* * * * *